(12) United States Patent
Han et al.

(10) Patent No.: US 12,278,760 B2
(45) Date of Patent: Apr. 15, 2025

(54) COMMUNICATION SIMULATION BETWEEN AN ACCESS POINT AND AN ELECTRONIC DEVICE

(71) Applicant: Hewlett Packard Enterprise Development LP, Spring, TX (US)

(72) Inventors: Jianpo Han, Beijing (CN); Liao Xu, Beijing (CN); Zhen Zhong, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 363 days.

(21) Appl. No.: 18/050,170

(22) Filed: Oct. 27, 2022

(65) Prior Publication Data

US 2024/0146651 A1 May 2, 2024

(51) Int. Cl.
*H04L 45/74* (2022.01)
*H04L 69/22* (2022.01)
*H04W 40/02* (2009.01)

(52) U.S. Cl.
CPC .............. *H04L 45/74* (2013.01); *H04L 69/22* (2013.01); *H04W 40/02* (2013.01)

(58) Field of Classification Search
CPC ......... H04L 45/74; H04L 69/22; H04W 40/02
See application file for complete search history.

(56) References Cited

U.S. PATENT DOCUMENTS

| | | |
|---|---|---|
| 8,578,457 B2 | 11/2013 | Kan |
| 10,431,080 B2 | 10/2019 | Elsheemy |
| 10,574,692 B2 | 2/2020 | Drake |
| 2004/0064584 A1* | 4/2004 | Mitchell ............... H04L 63/029 709/245 |
| 2016/0072768 A1 | 3/2016 | Ibsies |
| 2017/0142374 A1 | 5/2017 | Berg |
| 2018/0359811 A1 | 12/2018 | Verzun et al. |
| 2020/0076734 A1* | 3/2020 | Naveen ................... H04L 41/40 |
| 2020/0099706 A1 | 3/2020 | Righi et al. |

FOREIGN PATENT DOCUMENTS

| | | |
|---|---|---|
| WO | 2008/134831 A1 | 11/2008 |
| WO | 2018/187212 A1 | 10/2018 |

* cited by examiner

*Primary Examiner* — Kent Krueger
(74) *Attorney, Agent, or Firm* — Hewlett Packard Enterprise Patent Department (57) ABSTRACT

Implementations of the present disclosure relate to communication simulation between an access point and an electronic device. A method comprises obtaining a MAC protocol data unit (MPDU) for simulating a communication between an access point and an electronic device, and configuring a receiver address and a transmitter address of the MPDU. The method further comprises updating a header of the MPDU based on the configured receiver address and the configured transmitter address, and transmitting the MPDU according to the updated header. With these implementations, communications between the AP and the electronic device can be simulated by the AP.

20 Claims, 6 Drawing Sheets

COMMUNICATION SIMULATION BETWEEN AN ACCESS POINT AND AN ELECTRONIC DEVICE

BACKGROUND

Wireless communication system has become a part of life over the years. It has become a fundamental of existence in enterprises, homes, or public spaces such as an educational organization, a hospital, and a hotel, and so on. In the wireless communication system, wireless frames are transmitted over the air and may be received by nearby wireless devices. Although the wireless frames are encrypted, the frames still may be analyzed by an analyzer. If the analyzed result is known by an attacker, the attacker may take a malicious action, which will be harmful for a user.

BRIEF DESCRIPTION OF THE DRAWINGS

Through the following detailed descriptions with reference to the accompanying drawings, the above and other objectives, features and advantages of the example implementations disclosed herein will become more comprehensible. In the drawings, several example implementations disclosed herein will be illustrated in an example and in a non-limiting manner, where.

DETAILED DESCRIPTION

As described above, wireless frames are transmitted over the air and may be received by nearby wireless devices. Although the wireless frames are encrypted, the frames may be intercepted by an attacker. After analysis of the frames, the attacker may take some malicious actions.

Taking a home scenario as an example, and an access point (AP) is deployed in the home. The AP may communicate with an electronic device and connect the electronic device to the network. Multiple frames may be communicated between the AP and the electronic device during the communications. If the frames are captured by a sniffer and analyzed by an analyzer, a condition of the home may be inferred by an attacker from the captured frames. For example, from the captured frames, the attacker may know if there is any person in the home or if there is any surveillance camera deployed in the home. The attacker might take malicious activities such as stealing, if no one is at home or there is not any surveillance camera deployed in the home.

To address the problem as discussed above, various example implementations of the present disclosure propose a solution of simulating communications between an AP and an electronic device. In the proposed solution, the AP obtains a MAC protocol data unit (MPDU) for simulating a communication between the AP and an electronic device. The AP then configures a receiver address of the MPDU with a basic service set identifier (BSSID) of the AP, and configures a transmitter address of the MPDU with a MAC address of the electronic device. The AP further updates a header of the MPDU based on the configured receiver address and the configured transmitter address, and transmits the MPDU according to the updated header.

With these implementations, communications between an AP and an electronic device can be simulated. During the simulated communications, even frames were captured and analyzed by an attacker, the attacker would infer from the captured frames that the place (such as a home, an educational organization, or an enterprise) is in a safe-guarded condition, for example, a person is in the place, or a surveillance camera is deployed in the place. As a result, the attacker will not take any malicious action because the attacker opines that the place is in a safe-guarded condition. Therefore, the place is protected against malicious activities such as stealing properties, and security of the place can be enhanced.

Figure 1:
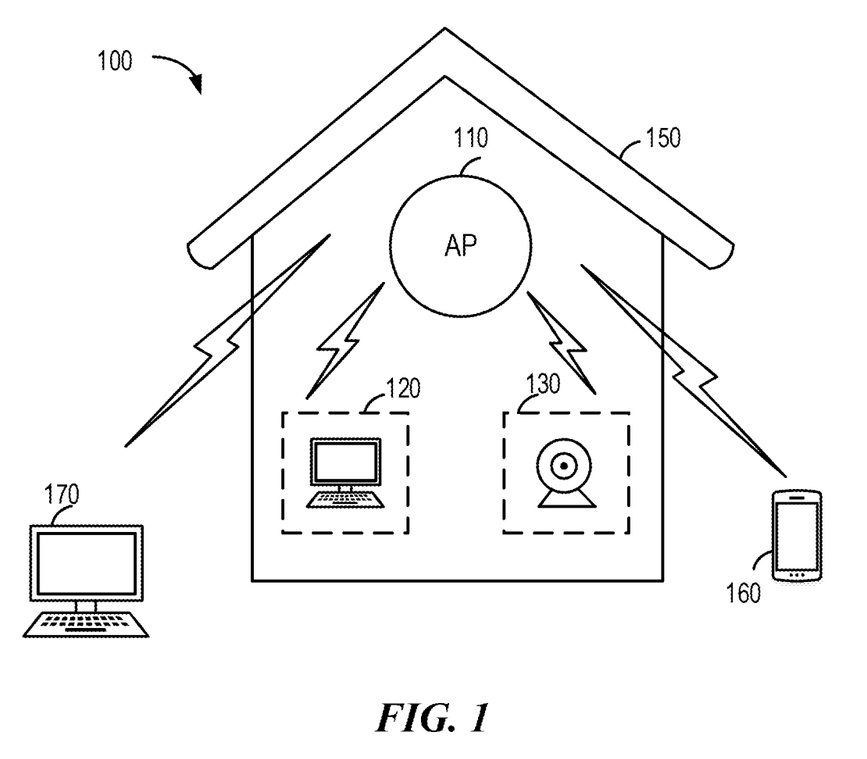
FIG. 1 illustrates an example communication environment in which example implementations of the present disclosure may be implemented.

FIG. 1 illustrates an example scenario 100 in which example implementations of the present disclosure may be implemented. In FIG. 1, a home scenario 100 is illustrated for an example, and an AP 110 is deployed in a home 150. An electronic device 120 in the home 150 may communicate with another electronic device 170 outside of the home via the AP 110. The electronic device 170 may be deployed in a different network from the electronic device. A person may capture frames transmitted between the AP 110 and an electronic device 120 using a frame capturing device 160. The frame capturing device 160 may also analyze the captured frames, and the person may know a safety condition of the home 150. Assuming that there is neither a person nor a camera in the home, the home 150 is in a relative low safety condition.

In some cases, the electronic device 120, such as a laptop, may be absent from the home 150 or is deactivate. Accordingly, the AP may not receive any actual frames from any electronic device. In these cases, for enhancing the security condition of the home 150, the AP 110 may simulate communications between the AP 110 and the electronic device 120. For example, the AP 110 may simulate a condition that the electronic device 120 communicates with the AP 110 so as to access the electronic device 170. Because the electronic device 120 is absent from the home 150 or is deactivated, the AP 110 simulates the communications between the electronic device 120 and AP 110 as if the electronic device 120 were actually communicating with the AP 110. As the communications are simulated by the AP 110, the electronic device 120 (shown as a computer) and the camera 130 are surrounded by dashed lines. It indicates that communications between the AP 110 and the electronic device 120 are simulated communications, and communications between the AP 110 and the camera 130 are also simulated communications. In addition, since the communications are simulated and implemented by the AP 110, the frames configured and transmitted by the AP 110 are referred to as "pseudo frames".

Although the electronic device 120 is shown as a computer and the camera 130 is shown as a camera, the electronic device 120 and the camera 130 are not limited to the types as shown in FIG. 1. The electronic device may include, but not limited to, a laptop, a camera, a desktop PC, PDA, or Wi-Fi phone and so on.

In an example implementation, the simulated communications between the AP 110 and the electronic device 120 may operate according to the wireless communication protocols such as Institute of Electrical and Electronic Engineers (IEEE) 802.11 standards, Wi-Fi Alliance Specifications, or any other wireless communication standards. The IEEE 802.11 standards may include the IEEE 802.11ay standard (e.g., operating at 60 GHz), the IEEE 802.11ad standard (sometimes referred to as "WiGig"), the IEEE 802.11be (referred to as "Wi-Fi 7") or any other wireless communication standards. Although the following description will be described in terms of 802.11 standards, the communication protocols are not limited to 802.11 standards, and other communication protocols also may be employed.

It should be noted that, the home scenario 100 is shown in FIG. 1 is only for illustration purpose, other scenarios may implement a technical solution of simulating communications between an AP and an electronic device according to the present disclosure.

Figure 2:
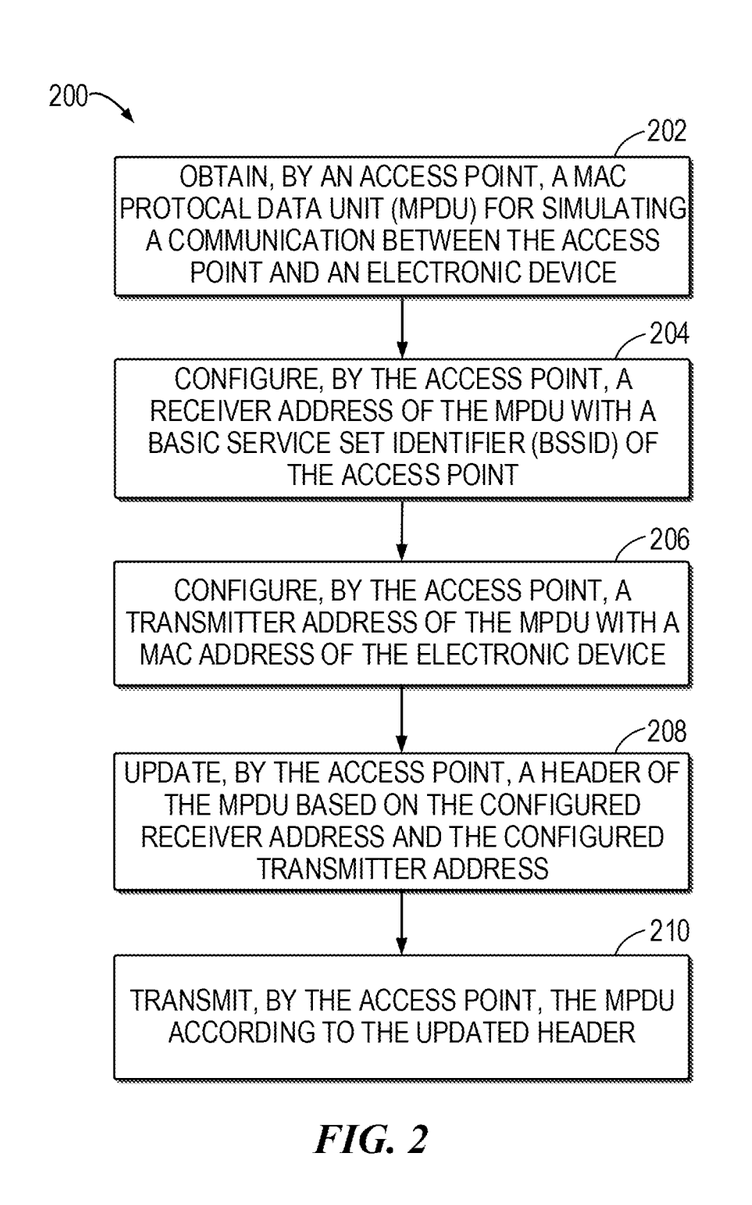
FIG. 2 illustrates a flow chart of an example method for simulating a communication between an AP and an electronic device in accordance with some example implementations of the present disclosure.

FIG. 2 illustrates a flow chart of an example method 200 for simulating a communication between an AP and an electronic device according to implementations of the present disclosure. The example method 200 may be performed by an AP, for example, the AP 110 as shown in FIG. 1. For the purpose of illustration, FIG. 2 is described in combination with FIG. 1. In addition, the steps of the flow chart in FIG. 2 are not all-inclusive and may include other steps not shown.

Figure 3:
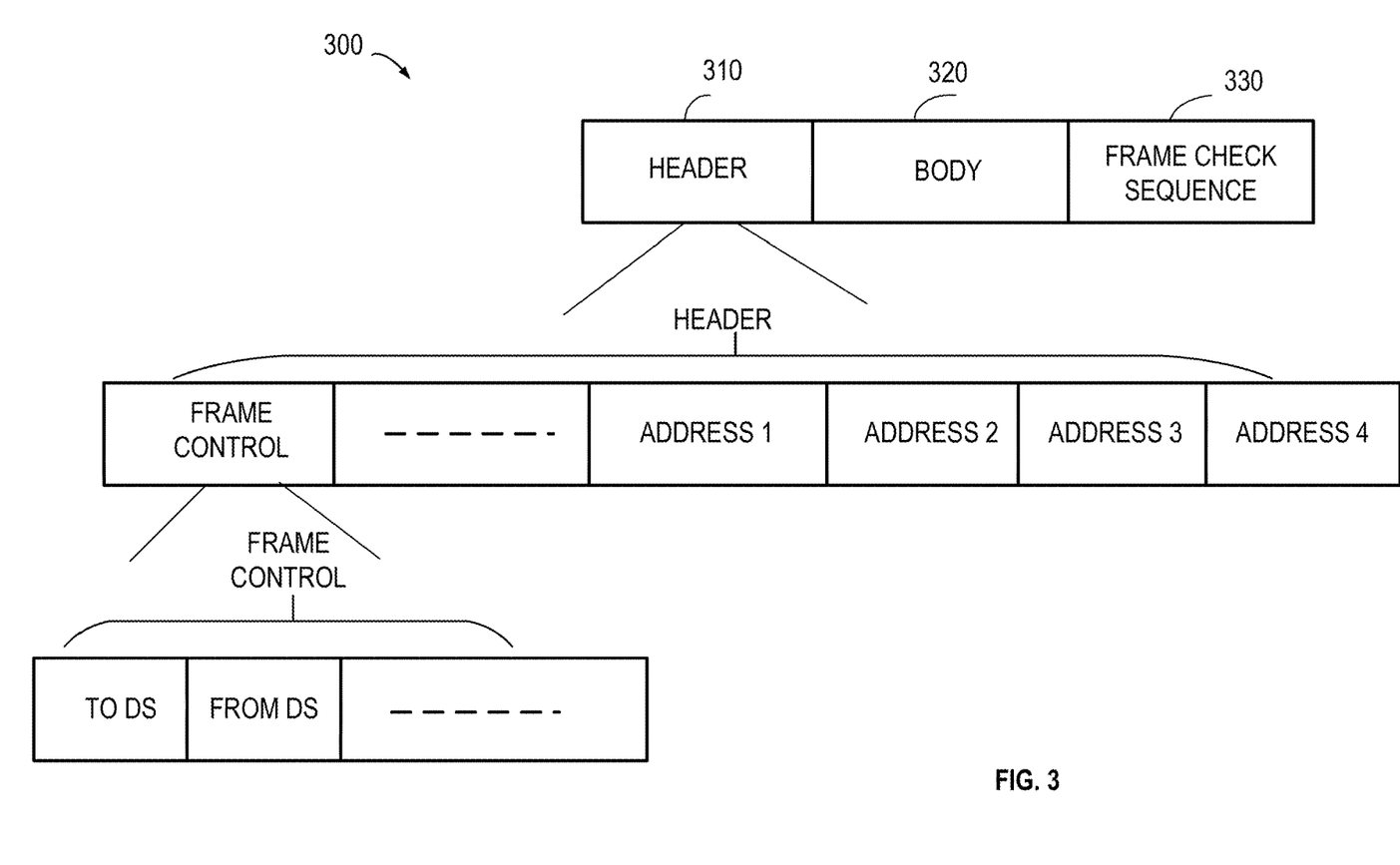
FIG. 3 illustrates an example MPDU header in accordance with some example implementations of the present disclosure.

At 202, the AP 110 obtains a MAC protocol data unit (MPDU) for simulating a communication between the AP 110 and an electronic device 120. The MPDU is a 802.11 data frame including a header, a body, and a frame check sequence. For example, FIG. 3 shows a format of a MPDU. As shown in FIG. 3, the MPDU 300 includes a header 310, a frame body 320, and a frame check sequence 330. The frame body 320 includes data to be transmitted, and the frame check sequence 330 is an error-detecting code for checking errors that occur in the MPDU frame 300. The header 310 includes multiple fields, including frame control, address 1, address 2, address 3, address 4, and so on. The MPDU header 310 shown in FIG. 3 is only for illustration. The frame header 310 may also include other fields that are used to configure the MPDU 300. In some examples, the frame control field includes two sub-fields: "to DS" and "From DS". The bit values for these two sub-field are associated with the configuration of the fields Address 1, Address 2, Address 3 and Address 4 in the MPDU header 310, which will be described below in combination with steps in the blocks 204 and 206.

In some examples, the MPDU 300 may be retrieved by the AP 110 from a database either disposed locally or remotely. The database may store multiple MPDUs that may be retrieved by the AP 110 in advance. In some implementations, the MPDUs stored in the database may be generated randomly by a computing device. In some implementation, the MPDUs stored in the database may include MPDUs that are captured by a computing device from traffics between an AP and another electronic device with the same type of the electronic device 120. The MPDUs stored in database may be obtained in various ways. For example, if the AP 110 stimulates a communication between the AP 110 and the electronic device 120, the MPDUs may be the frames captured from traffics between another AP and another electronic device.

At 204, the AP 110 configures a receiver address of the MPDU 300 with a basic service set identifier (BSSID) of the AP 110. In some examples, the AP 110 stimulates the communications between the AP 110 and the electronic device 120 when the electronic device is absent from the home 150 or is deactivated. In this case, the electronic device 120 may not transmit any frame to the AP 110 for accessing to the Internet, such as communicating with the electronic device 170. Then, the AP 110 may simulate a communication that the electronic device 120 communicates with the AP 110 to access the electronic device 170. In this case, the transmitter is the electronic device 120, the receiver is the AP 110, and the destination is the electronic device 170. Accordingly, the AP 110 configures the receiver address of the MPDU 300 with a basic service set identifier (BSSID) of the AP 110, and the BSSID is the MAC address of the AP 110.

As mentioned above, the bit values for the sub-fields "to DS" and "From DS" in the frame control field of the MPDU header are associated with the configuration of the fields of address 1, address 2, address 3, and address 4. In a situation that the AP 110 configures MPDU 300 to be an uplink frame (a frame that transmits from the electronic device 120 to the AP 110), the relationship of the fields of Address 1, Address 2, Address 3 and Address 4 with the sub-fields "to DS" and "From DS" is shown in table 1.

TABLE 1

| Fields | To DS | From DS | Address 1 | Address 2 | Address 3 | Address 4 |
|---|---|---|---|---|---|---|
| Value | 1 | 0 | RA = BSSID | TA = source address | DA = destination address | N/A |

Wherein RA represents a receiver address, TA represents a transmitter address, and DA represents a destination address.

Accordingly the AP configures the Address 1 field with the basic service set identifier (BSSID) of the AP 110, which is the MAC address of the AP 110. AP 110 creates an uplink frame, which may be indicated by the subfields "to DS" and "From DS" with values 1 and 0, respectively.

At 206, the AP 110 configures a transmitter address of the MPDU 300 with a MAC address of the electronic device 120. As the AP 110 simulates communications between the AP 110 and the electronic device 120, the source address of the communication is the MAC address of the electronic device. In this case, the transmitter address of the MPDU 300 is the MAC address of the electronic device 120, the receiver address of the MPDU 300 is BSSID of the AP 110. The AP 110 configures the Address 2 field with the MAC address of the electronic device 120, as shown in table 1.

At 208, the AP 110 updates the header of the MPDU 300 based on the configured receiver address and the configured transmitter address. Accordingly, the pseudo uplink frame is generated by the AP 110 for simulating the communication between the AP 110 and the electronic device 120.

At 210, the AP 110 transmits the pseudo uplink frame MPDU 300 according the updated header. Besides the configured address fields, the header of the pseudo uplink frame MPDU 300 may also include some other fields (for example, frame rate) to control transmission of the MPDU 300. The AP may transmit the pseudo uplink frame MPDU 300 according to configurations set in the header. From the perspective of the person, even the person captures the frame MPDU 300, as the frame MPDU 300 is configured by the AP 110 to be an uplink frame, the person may still believe the electronic device 120 is active and communicates with the AP 120. The person may infer a host is in the home 150 and is discouraged from taking any malicious activities.

In some example implementations, the AP 110 may also configure a destination address of the pseudo uplink frame MPDU 300 with a MAC address of a further electronic device, such as the electronic device 170. For example, the AP 110 configures the address 3 field with the MAC address of the electronic device 170, as shown in table 1. Accordingly, the pseudo uplink frame MPDU 300 simulating transmission from the electronic device 120 can be configured by the AP 110.

The AP 110 may transmit the configured MPDU 300. For example, the AP 110 may generate a PLCP protocol data unit (PPDU) by encapsulating the configured MPDU 300 with a PLCP header, and transmit the generated PPDU including the pseudo uplink frame MPDU 300 according to the PLCP header. In some examples, the PLCP header may include multiple fields. The fields may be configured by AP 110 to instruct the hardware of the AP 110 to transmit the PPDU. That is, the AP 110 may transmit PPDU according to the configured PLCP header. In some examples, the AP 110 may configure the PLCP header with at least one of a bandwidth, a frame length, a number of spatial streams, a last PSDU indicator, a code rate, or a code type. The AP may generate the PPDU by encapsulating the pseudo uplink frame MPDU 300 with the configured PLCP header, and transmit the generated PPDU according to the configuration of the PLCP header.

In some example implementations, the AP 110 may configure the PLCP header in accordance with a transmission pattern of the electronic device 120 if the pseudo uplink frame MPDU 300 is generated for simulating transmission from the electronic device 120 to the AP 110. For example, if the electronic device 120 generally transmits the MPDU in two spatial streams, the AP 110 may configure the field "a number of spatial streams" with a value of two. Moreover, if the electronic device 120 generally transmits MPDU frames with a frame length of 1400 bytes, the AP 110 may configure the field "frame length" with a value of 1400 bytes. The AP 110 may configure other fields in the PLCP header in a similar way according to the transmission pattern of the electronic device 120. Therefore, in addition to the address configuration of the MPDU header, the transmission configuration in the PLCP header enhances the effect of simulating communications between the AP 110 and the electronic device 120. Therefore, a person who captures the PPDU transmitted by the AP 110 may still believe the electronic device 120 is active and communicates with the AP 120, and is discouraged from taking any malicious activities.

In some example implementations, the AP 110 may also transmit pseudo downlink MPDU frames. For example, the AP 110 may retrieve another MPDU from the database either disposed locally or remotely, and configures the MPDU header of the MPDU. For example, the AP 110 may configure the receiver address of the MPDU a MAC address of the electronic device 120. The AP 110 may configure a transmitter address of the MPDU with BSSID of the AP 110. Thus, a pseudo downlink MPDU is obtained to simulate AP 110 transmitting frames to the electronic device 120.

As mentioned above, the bit values for the sub-fields "to DS" and "From DS" in the frame control field are associated with the configuration of the fields of address 1, address 2, address 3, and address 4. In a situation that the AP configures pseudo downlink MPDUs (frames that transmits from the AP 110 to the electronic device 120), the relationship of the fields of Address 1, Address 2, Address 3 and Address 4 with the sub-fields "to DS" and "From DS" is shown in table 2.

TABLE 2

| Fields | To DS | From DS | Address 1 | Address 2 | Address 3 | Address 4 |
|---|---|---|---|---|---|---|
| Value | 0 | 1 | RA = DA | TA = BSSID | SA | N/A |

Wherein RA represents a receiver address, TA represents a transmitter address, and DA represents a destination address.

Figure 4:
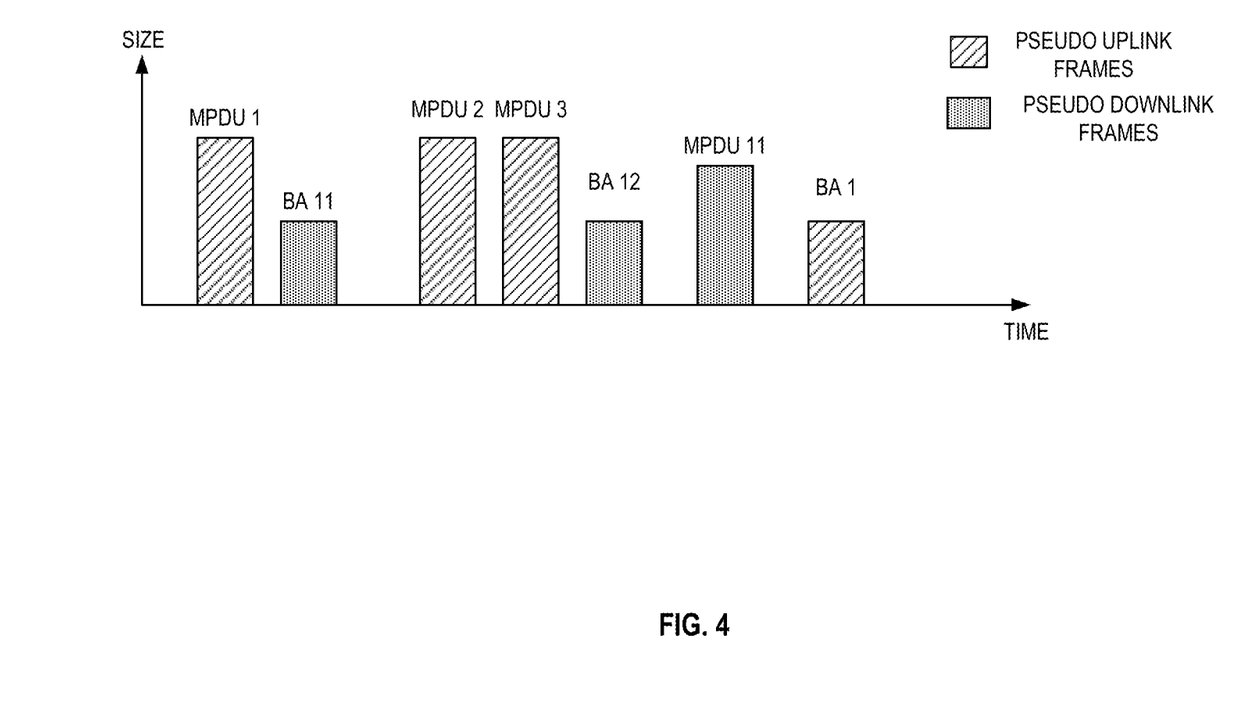
FIG. 4 illustrates a diagram showing an example of simulated communications between an access point and an electronic device in accordance with some example implementations of the present disclosure.

FIG. 4 is a diagram showing an example of simulated communications between the AP 110 and the electronic device 120. The pseudo uplink frames and the pseudo downlink frames as shown in FIG. 4 are generated by the AP 110. The pseudo uplink frames are generated by the AP 110 to simulate frames transmitted from the electronic device 120 to the AP 110, and the pseudo downlink frames are generated by the AP 110 to simulate frames transmitted from the AP 110 to the electronic device 120. The AP 110 transmits the pseudo uplink frames and the pseudo downlink frames to simulate communications between the AP 110 and the electronic device 120.

As shown in FIG. 4, instead of transmitting all the pseudo uplink frames and the pseudo downlink frames together, the AP 110 transmits the frames in accordance with a transmission pattern of the communications between the AP 110 and the electronic device 120. For example, a pseudo data frame is accompanied with a pseudo confirmation frame from the opposite link. For example, a pseudo downlink confirmation frame BA 11 follows up a pseudo uplink frame MPDU 1, and there are some subsequent pseudo uplink frames (such as MPDU 2, MPDU 3 and BA 1) and pseudo downlink frames (such as BA 12 and MPDU 11). Therefore, the simulated communication process as shown in FIG. 4 further enhances the effect of simulating communications between the AP 110 and the electronic device 120.

In some example implementations, to simulate the communications between the AP 110 and electronic device 120, the AP 110 may further configure a first power parameter for the MPDU 300. For example, the AP 100 may configure the first power parameter with a value of P1. The AP 110 may transmit the power parameter to the hardware of the AP 110 to instruct the hardware to transmit the MPDU 300 in accordance with the power parameter P1.

When the electronic device 120 is active, the electronic device 120 may transmit uplink frames to another electronic device 170 via AP 110 with varied power parameters. Accordingly, when transmitting multiple pseudo uplink MPDU frames, the AP 110 may configure varied power values for the multiple pseudo uplink MPDU frames to reflect an uplink power transmission pattern of the electronic device 120.

In some example implementations, the AP 110 may retrieve another MPDU from the database either disposed locally or remotely, and configures the MPDU by performing the steps at 204-208. Therefore, the receiver address (such as Address 1 field) of the MPDU is configured with BSSID of the AP 110, and the transmitter address (such as Address 2 field) of the MPDU is configured with the MAC address of the electronic device 120, and the destination address (such as Address 3 field) of the MPDU is configured with the address of the electronic device 170. The AP 110 may further configure a second power parameter for the MPDU. For example, the AP 100 may configure the second power parameter with a value of P2. The AP 110 may transmit the power parameter to the hardware of the AP 110 to instruct the hardware to transmit the MPDU 300 in accordance with the power parameter P2. In some examples, the value P1 is different from the value P2. Therefore, an uplink power transmission pattern can be simulated accordingly.

In some example implementations, there is a camera 130 for providing video surveillance in the home 150. The camera 130 may also communicate with the AP 110 to provide video frames to another electronic device, such as the electronic device 170. The AP 110 may also simulate the communications between the AP 110 and the camera 130. The pseudo downlink frames and pseudo uplink frames are configured in similar ways as describe above. For example, for the picture stationary and 1080p resolution camera, the uplink throughput may be 2 Mbps, the downlink throughput may be less than 50 Kbps. For the frame size, according to frame size distribution, 1400 bytes may be used to simulate a length of a frame in the communication with a camera.

The transmission pattern for the camera frames can be similar with the transmission as shown in FIG. 4, and will be omitted for clarity and brevity. In order to simulate the communications between the AP 110 and camera 130, power parameters are also configured for the pseudo frames. For both the pseudo uplink frames and pseudo down link frames, the power parameters are the same, since the communications between the AP 110 and camera 130 are in a power constant transmission mode.

For example, when transmitting a pseudo uplink video frame MPDU 400, the AP 110 may configure a first power parameter for the MPDU 400. For example, the AP 100 may configure the first power parameter with a value of P1. For a pseudo downlink video frame MPDU, the AP 110 may configure a second power parameter for the MPDU. For example, the AP 100 may configure the second power parameter with a value of P2. In some implementation, the value P1 equals to the value P2.

Figure 5:
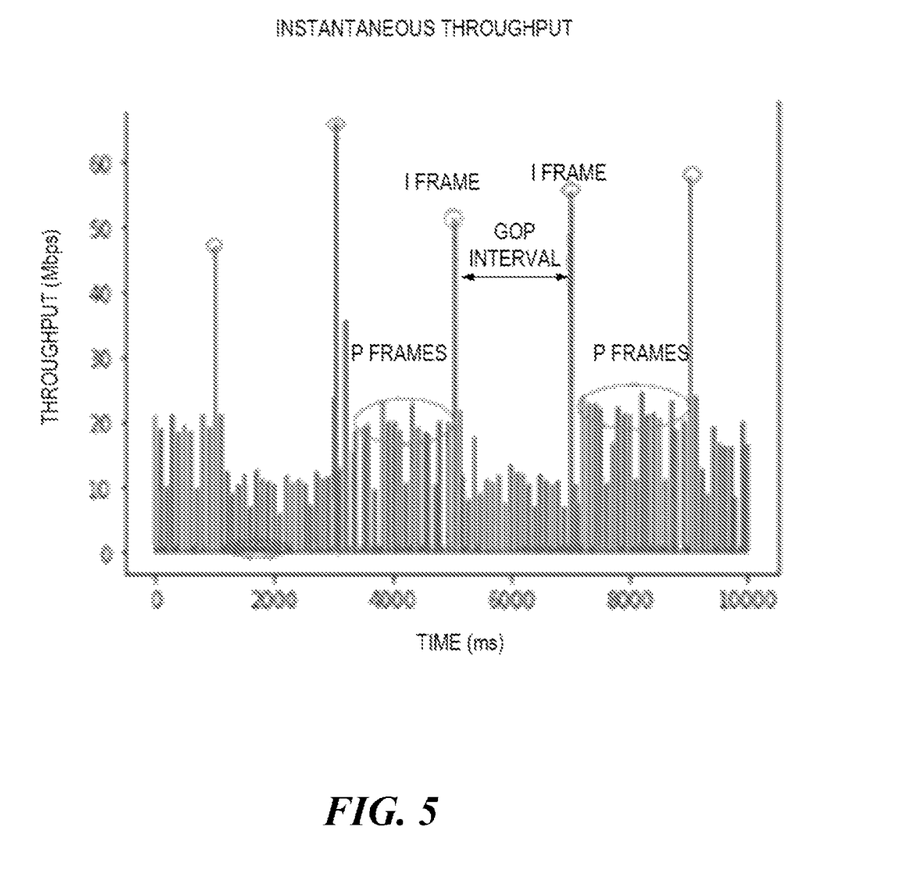
FIG. 5 illustrates an graph of transmissions of I/P/B frames in accordance with some example implementations of the present disclosure.

In some example implementations, during an actual video transmission, I/P/B frames are used for the transmission. FIG. 5 is a graph of instantaneous throughput for I/P/B frames. A pseudo uplink MPDU frame may indicate a first I-frame, and another MPDU may indicates a second I-frame neighboring to the first I-frame, as shown in FIG. 5. The transmission interval between the MPDU and the second MPDU is a Group of Pictures (GOP) interval. For 60 fps streams, the GOP interval may be 16.7 ms.

Figure 6:
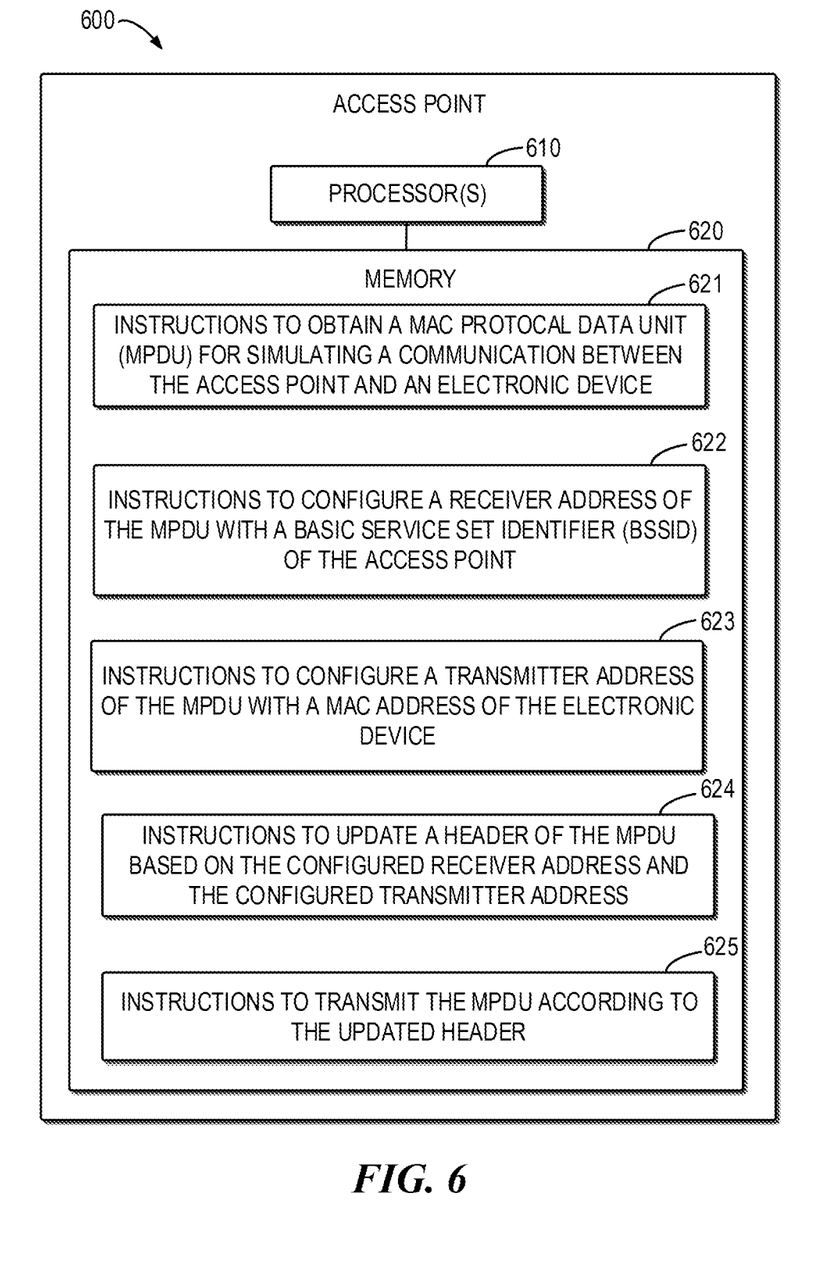
FIG. 6 illustrates a block diagram of an example access point in accordance with some example implementations of the present disclosure.

FIG. 6 illustrates a block diagram of an example AP 600 in accordance with some example implementations of the present disclosure. The AP 600 comprises at least one processor 610 and a memory 620 coupled to the at least one processor 610. The memory 620 stores instructions to cause the at least one processor 610 to implement acts of the method according to implementations of the present disclosure.

As illustrated in FIG. 6, the memory 620 stores instructions 621 to obtain a MAC protocol data unit (MPDU) for simulating a communication between the AP and an electronic device. The memory 620 further stores instructions 622 to configure a receiver address of the MPDU with a basic service set identifier (BSSID) of the AP. The memory 620 further stores instructions 623 to configure a transmitter address of the MPDU with a MAC address of the electronic device. The memory 620 further stores instructions 624 to update a header of the MPDU based on the configured receiver address and the configured transmitter address. The memory 620 further stores instructions 625 to transmit the MPDU according to the updated header.

In some implementations, the memory 620 further stores instructions to configure a destination address of the MPDU with a MAC address of a further electronic device.

In some implementations, the memory 620 further stores instructions to configure a physical layer convergence protocol (PLCP) header with at least one of a bandwidth, a frame length, a number of spatial streams, a last PSDU indicator, a code rate, or a code type.

In some implementations, the memory 620 further stores instructions to generate a PLCP protocol data unit (PPDU) by encapsulating the MPDU with the configured PLCP header, and transmit the generated PPDU including the MPDU according to the configured PLCP header.

In some implementations, the memory 620 further stores instructions to configure a first power parameter for the MPDU and transmit the MPDU according to the first power parameter.

In some implementations, the memory 620 further stores instructions to configure a second power parameter for a second MPDU, and transmit the second MPDU according to the second power parameter. Wherein a first value of the first power parameter is different from a second value of the second power parameter, a second receiver address of the second MPDU is configured with BSSID of the AP, and a second transmitter address of the second MPDU is configured with the MAC address of the electronic device.

In some implementations, wherein the electronic device includes a camera, the MPDU indicates a first I-frame, the second MPDU indicates a second I-frame neighboring to the first I-frame, and a transmission interval between the MPDU and the second MPDU is a Group of Pictures (GOP) interval.

In some implementations, the memory 920 may further stores instructions to transmit a third MPDU, wherein a third receiver address of the third MPDU is configured with a MAC address of a further electronic device, and a third transmitter address of the third MPDU is configured with BSSID of the AP.

The present disclosure also provides at least one computer program product tangibly stored on a non-transitory computer-readable storage medium. The computer program product includes program codes or instructions which can be executed to carry out the method of the present disclosure.

While the above implementations use a Wi-Fi communication standard as an illustrative example, in other implementations a wide variety of communication standards and, more generally, wireless communication technologies may be combined with the implementations of the present disclosure. Furthermore, while some of the operations in the foregoing implementations were implemented in hardware or software, in general the operations in the preceding implementations can be implemented in a wide variety of configurations and architectures. Therefore, some or all of the operations in the foregoing implementations may be performed in hardware, in software or both.

It should be noted that specific terms disclosed in the present disclosure are proposed for convenience of description and better understanding of example implementations of the present disclosure, and the use of these specific terms may be changed to another format within the technical scope or spirit of the present disclosure.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a computer-readable medium may be any tangible medium that may contain, or store a program for use by or in connection with an instruction execution system, apparatus, or device. The computer-readable medium may be a computer-readable signal medium or a computer-readable storage medium. A computer-readable medium may include but not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method, comprising:
   obtaining, by an access point (AP), a MAC protocol data unit (MPDU) for simulating a communication between the AP and an electronic device;
   configuring, by the AP, a receiver address of the MPDU with a basic service set identifier (BSSID) of the AP;
   configuring, by the AP, a transmitter address of the MPDU with a MAC address of the electronic device;
   updating, by the AP, a header of the MPDU based on the configured receiver address and the configured transmitter address; and
   transmitting, by the AP, the MPDU according to the updated header.

2. The method of claim 1, further comprising:
   configuring, by the AP, a destination address of the MPDU with a MAC address of a further electronic device.

3. The method of claim 1, further comprising:
   configuring, by the AP, a physical layer convergence protocol (PLCP) header with at least one of a bandwidth, a frame length, a number of spatial streams, a last PSDU indicator, a code rate, or a code type.

4. The method of claim 3, wherein transmitting the MPDU comprises:
   generating a PLCP protocol data unit (PPDU) by encapsulating the MPDU with the configured PLCP header; and
   transmitting the generated PPDU including the MPDU according to the configured PLCP header.

5. The method of claim 1, wherein transmitting the MPDU comprises:
   configuring, by the AP, a first power parameter for the MPDU; and
   transmitting, by the AP, the MPDU according to the first power parameter.

6. The method of claim 5, further comprising:
   configuring, by the AP, a second power parameter for a second MPDU; and
   transmitting, by the AP, the second MPDU according to the second power parameter,
   wherein a first value of the first power parameter is different from a second value of the second power parameter, a second receiver address of the second MPDU is configured with the BSSID of the AP, and a second transmitter address of the second MPDU is configured with the MAC address of the electronic device.

7. The method of claim 6, wherein the electronic device comprises a camera, the MPDU indicates a first I-frame, the second MPDU indicates a second I-frame neighboring to the first I-frame, and a transmission interval between the MPDU and the second MPDU is a Group of Pictures (GOP) interval.

8. The method of claim 1, further comprising:
   transmitting, by the AP, a third MPDU,
   wherein a third receiver address of the third MPDU is configured with a MAC address of a further electronic device, and a third transmitter address of the third MPDU is configured with the BSSID of the AP.

9. An access point (AP) comprising:
   at least one processor; and
   a memory coupled to the at least one processor, the memory storing instructions to cause the at least one processor to:
   obtain a MAC protocol data unit (MPDU) for simulating a communication between the AP and an electronic device;
   configure a receiver address of the MPDU with a basic service set identifier (BSSID) of the AP;
   configure a transmitter address of the MPDU with a MAC address of the electronic device; and
   transmit the MPDU according to the configured receiver address and the configured transmitter address.

10. The AP of claim 9, the instructions further causing the at least one processor to:
    configure a destination address of the MPDU with a MAC address of a further electronic device.

11. The AP of claim 9, wherein the instructions to transmit the MPDU comprise instructions to cause the at least one processor to:
configure a physical layer convergence protocol (PLCP) header with at least one of a bandwidth, a frame length, a number of spatial streams, a last PSDU indicator, a code rate, or a code type;
generate a PLCP protocol data unit (PPDU) by encapsulating the MPDU with the configured PLCP header; and
transmit the generated PPDU including the MPDU according to the configured PLCP header.

12. The AP of claim 9, wherein the instructions to transmit the MPDU comprise instructions to cause the at least one processor to:
configure a first power parameter for the MPDU; and
transmit the MPDU according to the first power parameter.

13. The AP of claim 12, the instructions further causing the at least one processor to:
configure a second power parameter for a second MPDU; and
transmit the second MPDU according to the second power parameter,
wherein a first value of the first power parameter is different from a second value of the second power parameter, a second receiver address of the second MPDU is configured with the BSSID of the AP, and a second transmitter address of the second MPDU is configured with the MAC address of the electronic device.

14. The AP of claim 9, the instructions further causing the at least one processor to:
transmit a third MPDU;
wherein a third receiver address of the third MPDU is configured with a MAC address of a further electronic device, and a third transmitter address of the third MPDU is configured with the BSSID of the AP.

15. A non-transitory computer-readable medium comprising instructions stored thereon which, when executed by an access point (AP), cause the AP to:
obtain a MAC protocol data unit (MPDU) for simulating a communication between the AP and a first electronic device;
configure a receiver address of the MPDU with a basic service set identifier (BSSID) of the AP;
configure a transmitter address of the MPDU with a MAC address of the first electronic device;
configure a destination address of the MPDU with a MAC address of a second electronic device;
update a header of the MPDU based on the configured receiver address, the configured transmitter address, and the configured destination address; and
transmit the MPDU according to the updated header.

16. The non-transitory computer-readable medium of claim 15, the instructions further causing the AP to:
configure a physical layer convergence protocol (PLCP) header with at least one of a bandwidth, a frame length, a number of spatial streams, a last PSDU indicator, a code rate, or a code type;
generate a PLCP protocol data unit (PPDU) by encapsulating the MPDU with the configured PLCP header; and
transmit the generated PPDU including the MPDU according to the configured PLCP header.

17. The non-transitory computer-readable medium of claim 15, the instructions further causing the AP to:
configure a first power parameter for the MPDU; and
transmit the MPDU according to the first power parameter.

18. The non-transitory computer-readable medium of claim 17, the instructions further causing the AP to:
configure a second power parameter for a second MPDU; and
transmit the second MPDU according to the second power parameter,
wherein a first value of the first power parameter is different from a second value of the second power parameter, a second receiver address of the second MPDU is configured with the BSSID of the AP, and a second transmitter address of the second MPDU is configured with the MAC address of the first electronic device.

19. The non-transitory computer-readable medium of claim 18, wherein the first electronic device comprises a camera, the MPDU indicates a first I-frame, the second MPDU indicates a second I-frame neighboring to the first I-frame, and a transmission interval between the MPDU and the second MPDU is a Group of Pictures (GOP) interval.

20. The non-transitory computer-readable medium of claim 15, the instructions further causing the AP to:
transmit the a third MPDU,
wherein a third receiver address of the third MPDU is configured with a MAC address of the second electronic device, and a third transmitter address of the third MPDU is configured with the BSSID of the AP.

* * * * *